S. STONE.
PIPE GRIP.
APPLICATION FILED JULY 8, 1919.
1,339,233.
Patented May 4, 1920.
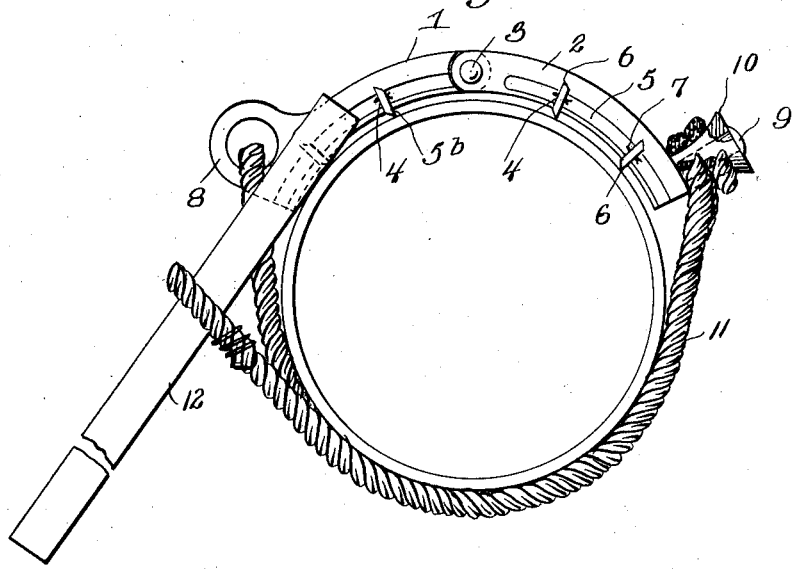
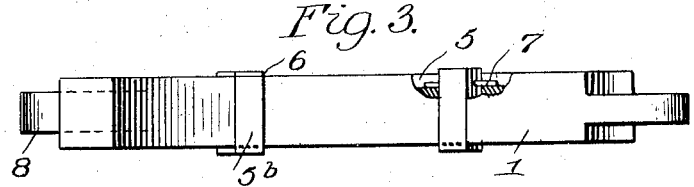
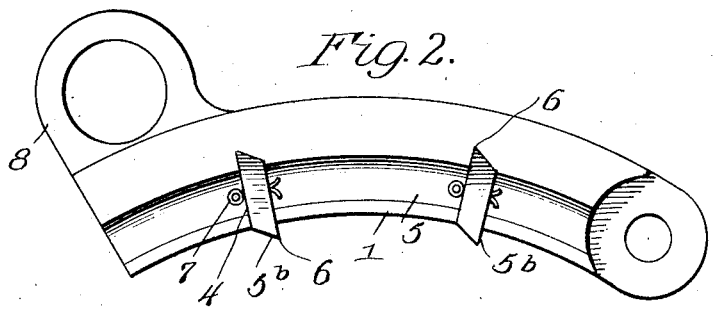
INVENTOR.
BY S. Stone.
Victor J. Evans
ATTORNEY.

UNITED STATES PATENT OFFICE.

STEWART STONE, OF BUTLER, PENNSYLVANIA.

PIPE-GRIP.

1,339,233.　　　　　　　Specification of Letters Patent.　　　Patented May 4, 1920.

Application filed July 8, 1919. Serial No. 309,285.

*To all whom it may concern:*

Be it known that I, STEWART STONE, a citizen of the United States, residing at Butler, in the county of Butler and State of Pennsylvania, have invented new and useful Improvements in Pipe-Grips, of which the following is a specification.

This invention relates to a pipe gripping device and has for its primary object to provide a simple device positive in its operation which will grip the pipe in such a manner that not a single element of the device will slip when acting upon a pipe.

An object of the invention is to provide a grip having reversible teeth so that the same may be efficiently used after one edge has been rendered useless.

Besides the above my invention is distinguished in the manner of associating the parts so that with very little effort excessive pressure can be brought to bear for unscrewing a pipe section.

With these and other objects in view the invention will be better understood from the following detailed description taken in connection with the accompanying drawing, wherein:—

Figure 1 is an end elevation of a pipe showing my invention applied thereto.

Fig. 2 is an enlarged elevation of one end portion of the jaw.

Fig. 3 is a bottom plan view of one of the jaws.

Again referring to the drawing illustrating one of the many forms in which my invention may be constructed, the numerals 1 and 2 designate the pair of jaws but at this point I wish to call attention to the fact that I do not desire to be limited in the use of any particular number of jaws. These jaws are pivoted together by a pin 3 so as to conform to the curvature of the pipe to which the device is connected. Each jaw is provided with radial slots 4 intersected by an arcuate groove 5. Arranged in each slot 4 is a tooth 5 the sharp end portion 6 of which extends in reverse directions so that the teeth can be reversed should one edge become mutilated. To prevent accidental removal of the tooth I provide a pin 7 arranged in the groove and passing through the tooth. Formed with and projecting radially therefrom is an apertured ear 8 adjacent the free end portion of the jaw 1. The jaw 2 at its free end is provided with the stub shaft or pin 9 upon which is rotatably mounted a roller 10.

The numeral 11 designates a flexible element shown as a rope having one end secured to the ear 8 while an intermediate portion is looped around the roller 10. The remaining end of the rope is formed into a loop slidably receiving a lever 12. By this latter construction it will be seen that besides enabling the operator to exert great pressure this lever draws the sections of the rope tightly in a direction to draw the jaws into biting engagement with the pipe so as to prevent any slipping.

From the foregoing description taken in connection with the accompanying drawing, it should be apparent that I have provided a simple substantial device that may be readily connected to a pipe and when in applied position great pressure is brought to bear for removing the pipe section from its associated section or for screwing one section to another in which case the teeth will be reversed so as to accomplish the proper gripping action between the jaws and the pipe. It is of course to be understood that the invention may be constructed in various other manners and the parts associated in other relations and therefore I do not desire to be limited in any manner except as set forth in the claims hereunto appended.

What I claim is:—

1. A pipe grip comprising a jaw including pivoted sections arranged end to end, each section being provided with a plurality of radial slots intersected by an arcuate groove, a plurality of teeth fitted in the slots of each section, fastening elements associated with the teeth and arranged in said grooves, a flexible element, and means carried by the respective sections of the grip for association with one end and the intermediate portion of said flexible element for the purpose specified.

2. A pipe grip comprising a pair of gripping jaws arranged end to end and pivotally connected together, each jaw having radial slots intersected by an arcuate groove, a plurality of teeth arranged in the slots of each jaw, fastening elements for holding the teeth fixed upon said jaw, said elements being arranged in said groove, the opposite ends of said teeth being reversely beveled, a flexible element, means carried by one of the jaws for association with one end of said element, and means carried by the other jaw for engagement with the intermediate portion of said element for the purpose specified.

3. A pipe grip comprising a pair of jaws arranged end to end and pivotally connected together, each jaw having a plurality of radial slots intersected by an arcuate groove, a plurality of teeth arranged in the slots of each jaw, means for holding the teeth fixed upon the jaws, said means being arranged in said groove, an apertured lug projecting from one of said jaws, an anti-friction roller journaled on the other of said jaws, and a flexible element having one end associated with said roller and threaded through said apertured lug for the purpose specified.

4. A pipe grip comprising a pair of gripping jaws arranged end to end and pivotally connected together, each jaw having a plurality of radial slots, teeth arranged in said slots, means for holding said teeth associated with said jaws, said teeth having their ends oppositely beveled, a roller journaled on one of said jaws, an apertured lug projecting from the other jaw, and a flexible element terminally associated with said roller and threaded through the apertured lug for the purpose specified.

In testimony whereof I affix my signature.

STEWART STONE.